United States Patent Office 2,808,427
Patented Oct. 1, 1957

2,808,427
USE OF LIME IN THE PREPARATION OF MONO-ESTERS OF N-ALKYL TEREPHTHALAMIC ACIDS

Bruce W. Hotten, Orinda, Calif., assignor to California Research Corporation, San Francisco, Calif., a corporation of Delaware No Drawing. Application June 23, 1955,
Serial No. 517,662

5 Claims. (Cl. 260—471)

The present invention is directed to a process of preparing derivatives of terephthalamic acids from terephthaloyl monochlorides.

Salts of terephthalamic acids (e. g., lithium octadecyl terephthalamate) are particularly useful as grease-thickening agents. As described in Hotten patent application Serial No. 475,299, filed December 14, 1954, metal salts of terephthalamic acids thicken lubricating oils to form extremely high melting point grease compositions having excellent resistance to emulsification in water.

Terephthalamic acids are normally prepared by a process comprising reacting a terephthaloyl monochloride with a primary amine. As of itself, this reaction is sluggish and leads to the formation of an emulsifiable mixture. Furthermore, the resulting terephthalamic acid, which is finally obtained after great difficulty, is recovered in a very low yield. Although the reaction of the terephthaloyl monochloride with an amine can be accomplished in the presence of sodium hydroxide, a large amount of the original acyl chloride (as much as 40 mol percent) is hydrolyzed by the presence of the sodium hydroxide. Thus, this type of reaction is extremely inefficient in that an unusually low yield of the desired terephthalamic acid is obtained.

The above-noted disadvantages in the preparation of terephthalamic acid derivatives from terephthalic acid have been overcome by the use of the process of the present invention.

In accordance with the present invention, it has been discovered that monoester terephthaloyl monochlorides react with primary amines in the presence of divalent metal oxides or hydroxides to form monoester terephthalamates.

It was entirely unexpected that the use of divalent metal oxides or hydroxides would increase the reaction rate and increase the yield of terephthalamic acids to about 90% of theory. The particular reason for this pronounced effect of a divalent metal oxide or hydroxide is not known. In contrast thereto, it was expected that the divalent metal oxides or hydroxides would neutralize the terephthaloyl monochloride reactants to form the calcium salts thereof. However, the expected reaction could not be detected. The divalent metal oxides or hydroxides not only serve as agents to promote the desired reaction to a degree heretofore unobtainable, but also form a reaction mixture which is not emulsified.

The process of this invention is illustrated by the following equation:

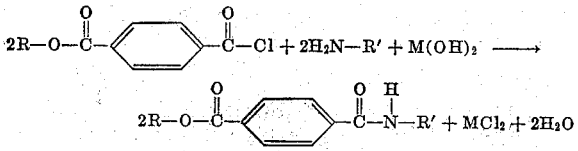

wherein R represents an ester radical, R' represents a primary amine radical, and M represents a divalent metal. As an ester radical, the R can be a straight-chain or branched-chain, saturated or unsaturated hydrocarbon radical. The number of carbon atoms in the ester radical would be governed by the ultimate use of the terephthalamate. For example, when the resulting terephthalamates are used as grease thickening agents, the hydrocarbon radicals preferably contain no more than 12 carbon atoms. Examples of ester radicals include the radicals derived from the following alcohols: methyl alcohol, ethyl alcohol, isopropyl alcohol, propyl alcohol, butyl alcohol, tertiary butyl alcohol, amyl alcohol, isoamyl alcohol, hexyl alcohol, heptyl alcohol, decyl alcohol, lauryl alcohol, cetyl alcohol, octadecyl alcohol, triacontyl alcohol, etc.

The primary amine radical, R', can be obtained from primary amines having straight-chain, branched-chain or cyclic, saturated or unsaturated, hydrocarbon radicals containing from 2 to 30 or more carbon atoms. Here, too, the number of carbon atoms in the primary amine would be governed by the end use of the terephthalamate. In the preparation of grease thickening agents, it is preferred that the primary amines contain from 12 to 22 carbon atoms. The primary amines include aliphatic and aromatic primary amines, exemplified by methyl amines, ethyl amine, butyl amine, hexyl amine, octyl amine, decyl amine, dodecyl amine, tetradecyl amine, hexadecyl amine, octadecyl amine, eicosyl amine, docosyl amine, aniline, etc.

Although the divalent metal "M" includes the metals of Group II of Mendeleeff's Periodic Table, the alkaline earth metals, calcium and magnesium, are preferred because with these latter metals, higher yields of terephthalamic acids are obtained.

Examples of terephthaloyl monochlorides which can be used as the reactants in the process herein include monomethyl terephthaloyl monochloride, monoethyl terephthaloyl monochloride, monopropyl terepthaloyl monochloride, monobutyl terephthaloyl monochloride, monooctyl terephthaloyl monochloride, monodecyl terephthaloyl monochloride, monocetyl terephthaloyl monochloride, etc.

Although the examples hereinabove are to the phthaloyl chlorides, it is within the meaning of the invention to include the phthaloyl bromides and the phthaloyl iodides as reactants herein.

The preparation of terephthalamates according to the process herein may be accomplished without a solvent. However, greater yields and increased reaction rates are obtained by the use of various solvents, particularly hydrocarbon solvents. The hydrocarbon solvents which can be used herein include aromatic and aliphatic hydrocarbon solvents, such as benzene, toluene, xylene, heptane, octane, decane, dodecane, petroleum lubricating oil (e. g., naphthenic or paraffin base lubricating oils), etc., and nonreactive solvents such as esters and ethers (e. g., esters of sebacic acid, isopropyl ether, etc.). These solvents may be used individually or as mixtures thereof.

It is preferred that the reactants form a continuous phase in the solvent, i. e., are solubilized in the solvent. When the terephthalamic acids or derivatives are to be recovered as compounds per se, it is preferred to use solvents from which the compounds readily precipitate as the solvents are cooled, or solvents which are readily removed from the compound by distillation. On the other hand, if the terephthalamic acid is to be retained in the solvent for such purpose as for grease preparation, it is preferred to use a petroleum oil as a solvent.

Whereas the process set forth hereinbelow is considered primarily for the preparation of terephthalamic acids (i. e., para-phthalamic acids), this process may also be used for the preparation of iso-phthalamic acids (i. e., meta-phthalamic acids). Thus, the process herein may be used in the preparation of phthalamic acids selected from the group consisting of terephthalamic acids and isophthalamic acids.

In the preparation of monoesters of terephthalamic acids according to the process of the present invention, a mixture comprising about 1 mol of terephthaloyl chloride, about 1 mol of an alkyl amine (although the mol ratio of terephthaloyl chloride to alkyl amine is preferably 1:1, the reaction may have a slight excess, e. g., 10%, of either one of the reactants), from about 0.5 to 1.0 mols of a divalent metal oxide or hydroxide (preferably about 10% excess of divalent metal oxide or hydroxide is used), and from about 0 to about 5 volumes or more of a hydrocarbon solvent (preferably about 1 to 2 volumes of hydrocarbon solvent) is heated to a temperature sufficient to form a homogeneous solution (e. g., from about 70° F. to about 250° F. or higher) (preferably from about 90° F. to about 125° F.).

The mixture is then cooled to temperatures in the range of about 70° F. to about 150° F. and it is water washed at that temperature (preferably hot water) until the water washes are substantially negative to the halide ion test. (It is preferred to wash the reaction mixture consecutively with a dilute acid (e. g., dilute aqueous hydrochloric acid solution), then a dilute base (e. g., a dilute aqueous ammonium hydroxide solution) prior to washing with water.)

The water layer is separated from the oil layer, which is then cooled to precipitate out the terephthalamic acid derivative, or the mixture may be heated to remove the solvent by distillation. The solvent is recovered and recycled to the reaction vessel for use in subsequent preparations of terephthalamic acid and its derivatives.

In the preferred embodiment of the invention, about 1 mol of an alkyl ester of terephthaloyl monochloride, about 1 mol of alkyl amine, and about 0.5 mol of a divalent metal oxide or hydroxide are incorporated in a hydrocarbon solvent, preferably in a mononuclear aromatic hydrocarbon solvent (e. g., toluene). The volume of the solvent is about 200% of the volume of the terephthaloyl monochloride ester. The mixture is then heated to temperatures of about 180° F. to form a clear solution. The whole mixture is heated at reflux temperature from about 1 to 4 or more hours, i. e., for a time sufficient to form a monoester of terephthalamic acid, after which the mixture is washed relatively free of halide ion at a temperature sufficient to keep the terephthalamic acid in solution (preferably 150° F. to about 200° F.). When the solvent is cooled, the product precipitates from solution and this precipitate is recovered by filtration, washed with either, and dried. The terephthalamate thus prepared in high yields is relatively pure. If desired, rather than recover the terephthalamate by filtration, the solvent can be removed by distillation.

The following examples illustrate the preparation of terephthalamic acid derivatives from terephthaloyl monochloride by the process set forth herein.

*Example 1.—Preparation of a methyl terephthalamate*

A mixture of 300 grams (1 mol) of Armeen HT, 700 ml. of toluene, 37 grams (0.5 mol) of calcium hydroxide, and 100 ml. of water was charged to a 2-liter flask and stirred at room temperature (70–75° F.). To this mixture was added 330 ml. (1 mol) of methyl terephthaloyl chloride during a period of 30 minutes, during which time the temperature rose to about 160° F., after which the mixture was heated at about 175° F. for an additional 30 minutes. One liter of toluene was then added and the whole mixture was consecutively washed with hot (approximately 155° F.) 5% aqueous hydrochloric acid solution, a 5% aqueous ammonium hydroxide solution, and water until the mixture was free of chloride ions. The toluene was removed by distillation under a blanket of nitrogen. The resulting monomethyl terephthalamate was obtained in a yield of 97% of theory. The saponification equivalent was 453.

Armeen HT is a mixture of amines comprising 25% hexadecylamine, 71% octadecylamine, and 5% octadecanylamine. 85% of this mixture consists of primary amines.

*Example 2.—Preparation of grease from the methyl terephthalamate of Example 1*

A mixture of 98.3 grams of the above methyl terephthalamate of Example 1 and 900 grams of a California solvent refined paraffinic base oil having a viscosity of 480 SSU at 100° F. was heated to 250° F., then cooled to 120° F., after which an aqueous solution of 8.68 grams of sodium hydroxide in 100 ml. of water was added. This mixture was milled through a Manton Gaulin colloid mill, after which the mixture was heated to 305° F., cooled to 120° F., then remilled. The resulting grease had an ASTM dropping point of 469° F., and a worked penetration of 275.

*Example 3.—Preparation of a methyl terephthalamate*

A mixture of 2880 grams (10 mols) of Armeen HT, 6500 grams of toluene, 378 grams (5.1 mols) of calcium hydroxide, and 1000 grams of water was charged to a 15-gallon steel-jacketed kettle at 70° F. This mixture was agitated and warmed sufficient to disperse the Armeen HT in the toluene solution. When the mixture had been cooled to room temperature, 3610 grams (10.2 mols) of methyl terephthaloyl chloride was added during a period of 10 minutes, during which time the reaction kettle was cooled with water to keep the reaction temperature below 150° F. The mixture was then heated from temperatures ranging from 180 to 200° F. during a period of 30 minutes, after which the toluene was removed by distillation. The remaining mixture was washed at about 200° F. consecutively with a 5% aqueous acetic acid solution, a 5% aqueous ammonium hydroxide solution, and water for the purpose of removing impurities. The resulting monomethyl terephthalamate (2275 grams), which was dried at 320° F., had a saponification equivalent of 459.

*Example 4.—Preparation of grease from the product of Example 3*

A mixture of 285 grams of the methyl terephthalamate of Example 3, 15 grams of trimethyl dihydroquinoline polymer, and 2384 grams of a California solvent refined paraffin base oil having a viscosity of 480 SSU at 100° F., was heated to 300° F., after which an additional 1284 grams of the same oil were added and the mixture was cooled to 120° F. A mixture consisting of 27.5 grams of sodium hydroxide in 100 ml. of water and 75 grams of Ethomeen S-15 was added. The resulting mixture was passed through a Manton Gaulin colloid mill at a maximum pressure of 2000 p. s. i. The mixture was then heated to 310° F., cooled to 120° F., and remilled at 4000 p. s. i. The resulting grease had an ASTM dropping point of 401° F. and an ASTM worked penetration of 292.

Ethomeen S-15 is an amine of soybean fatty acids containing five ethoxy units attached to the amine nitrogen. The general formula is as follows:

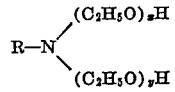

wherein R is a soybean fatty acid radical, and $x$ and $y$ are numbers having values such that $x+y=5$.

*Example 5.—Preparation of a methyl terephthalamate*

A mixture of 288 grams of Armeen HT and 40 grams of calcium hydroxide was heated until the Armeen HT was in a molten state, after which this mixture was cooled to about 120° F. A mixture of 300 grams of toluene and 358 grams of methyl terephthaloyl chloride was added during a period of 1.5 hours at temperatures ranging from about 125° F. to about 165° F. The toluene was then removed by distillation, and the remaining product was washed consecutively with hot 5% aqueous acetic acid solution, hot 5% aqueous ammonium hydroxide solution, and hot water until free of basic, acetic, and calcium chloride impurities. The recovered methyl terephthalamic acid weighed 443 grams (representing a yield of 89% of theory). The saponification equivalent was 500.

While the above specification examples and detailed description of the invention set forth the preferred embodiments of the invention, still other embodiments and variants are within the scope of the process set forth herein.

I claim:

1. The process of preparing monoesters of terephthalamic acids comprising forming an admixture of a monoester of terephthaloyl monochloride, a primary aliphatic amine containing from 12 to 22 carbon atoms, an aromatic hydrocarbon solvent and calcium hydroxide at temperatures from about 70° F. to about 250° F., washing said admixture until essentially free of chloride ions and removing said solvent by distillation.

2. The process of preparing monoesters of terephthalamic acids comprising forming an admixture of a monoester of terephthaloyl monochloride, a primary aliphatic amine containing from 12 to 22 carbon atoms, wherein the mol ratio of said terephthaloyl chloride to said amine has a value of about 1, an aromatic hydrocarbon solvent, and calcium hydroxide, wherein the mol ratio of said hydroxide to said terephthaloyl chloride has a value from 0.5 to about 1, at a temperature from about 70° F. to about 250° F., water washing said admixture until said admixture is essentially free of chloride ions, and removing said solvent by distillation.

3. The process of preparing monoesters of terephthalamic acids comprising forming an admixture of a monoester of terephthaloyl monochloride, a primary aliphatic amine containing from 12 to 22 carbon atoms, wherein the mol ratio of said terephthaloyl chloride to said amine has a value of about 1, toluene, and calcium hydroxide, wherein the mol ratio of said hydroxide to said terephthaloyl chloride has a value from 0.5 to about 1, at a temperature from about 70° F. to about 250° F., water washing said admixture until said admixture is essentially free of chloride ions, and removing toluene by distillation.

4. A process of preparing monoesters of terephthalamic acids comprising forming an admixture of the monomethyl ester of terephthaloyl monochloride, a primary aliphatic amine containing from 12 to 22 carbon atoms, toluene, and calcium hydroxide at a temperature from about 70° F. to about 250° F., washing said admixture until said admixture is essentially free of chloride ions, and removing toluene by distillation.

5. The process of preparing monoethyl esters of terephthalamic acids comprising forming an admixture of a monomethyl terephthaloyl monochloride, n-octadecyl amine, wherein the mol ratio of said monochloride to said amine has a value of about 1, toluene, and calcium hydroxide in an amount such that the mol ratio of said amine to said chloride has a value about 0.5, at temperatures from about 70° F. to about 250° F., water washing said admixture until said admixture is essentially free of chloride ions, and removing said toluene by distillation.

References Cited in the file of this patent

Beilstein, IX, 365, 372 (1932); 601 (1949).
Sheehan et al.: J. A. Chem. Soc., 71, 1859 (1949).